Patented Apr. 10, 1951

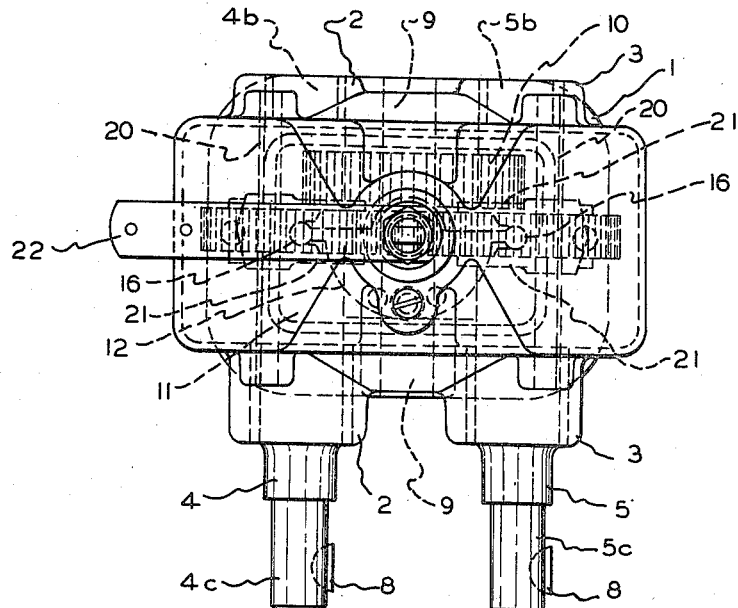
FIG. I.
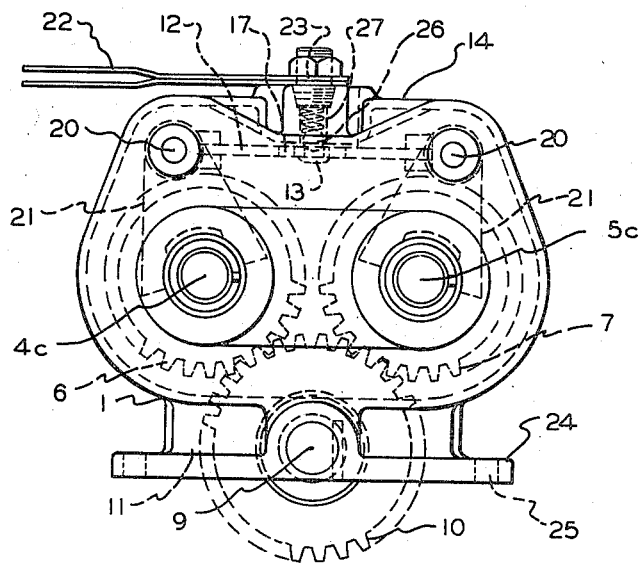
FIG. II.
Inventor
ROBERT W. WAGNER
By Beaman & Patch.

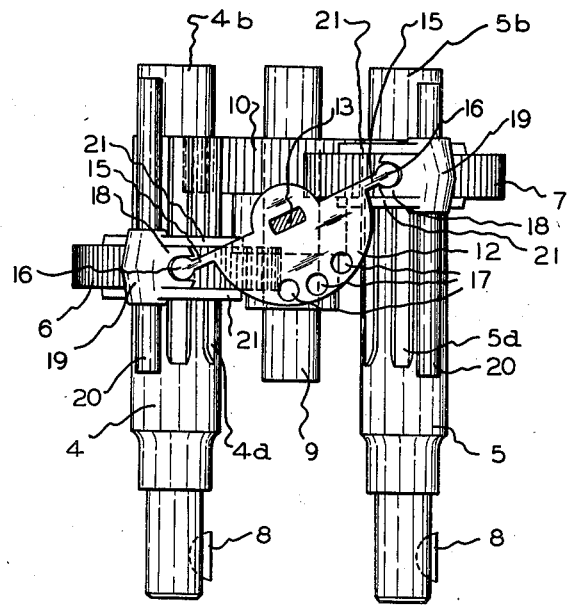
Fig. III.

2,548,182

UNITED STATES PATENT OFFICE 2,548,182

POWER TAKE-OFF

Robert W. Wagner, Chelsea, Mich.

Application January 3, 1948, Serial No. 455

4 Claims. (Cl. 74—15.86)

This invention relates to power take-off devices for connection with a main driving source and is more particularly concerned with such power take-off devices as are employed for attachment to motor vehicles, such as to motor trucks or tractors or to automobiles generally and which are capable of being connected with the transmission thereof so as to provide a readily available power source for operating external equipment.

An object of the present invention is to provide a power take-off device of the above described character wherein at least two power take-off shafts are provided and arranged to be driven alternatively, whereby to provide for the connection of the power take-off device as a whole with at least two separate pieces of equipment, the operation of which it is desired should be effectable from the same power take-off device.

Another object of the invention is to provide a power take-off device in which separate power take-off shafts are under the control of a simple yet efficient shifter mechanism by which the power take-off shafts can be alternately connected to be driven or be both disconnected from a common driving gear so as to secure a neutral or inoperative condition of the device as a whole.

Other objects and advantages of the invention will be rendered clear from a consideration of the following description of one practical embodiment of the invention, by way of example only, and with reference to the accompanying drawings in which:

Fig. I is a plan view of one practical embodiment of the invention, with the gearing shown in the neutral condition, Fig. II is an end elevational view of Fig. I, and Fig. III is a plan view of the gearing and shift gear mechanism.

In carrying the invention into effect according to one practical embodiment thereof shown in the drawings a power take-off device is provided which comprises a hollow casing 1 having on opposite sides thereof pairs of opposed journal bosses 2, 3 for the rotatable mounting therein, by suitable bearings, of a pair of parallel and spaced shafts 4, 5 each having a splined portion 4a, 5a upon which there is mounted a spur gear 6, 7 axially slidable along the splined portions of their respective shafts 4, 5.

Each shaft, at one end 4b, 5b, thereof terminates within its respective boss 2, 3 of the housing and at its opposite end has a portion 4c, 5c which projects outside the housing and is formed to receive a shaft key 8 for the coupling of the shafts to the equipment which it is desired to drive therefrom.

Also mounted within the housing 1, in parallel relationship with the shafts 4, 5, there is another but non-rotary shaft 9 upon which there is rotatably mounted a spur gear 10.

The shaft 9 extends centrally across an opening 11 in the bottom of the housing and the arrangement is such that a portion of the gear 10 projects outside the housing, as shown in Fig. II, while the remainder of the gear is contained within the hollow interior of the housing in position to have meshing engagement with either of the two spur gears 4, 5. The arrangement also provides for the obtaining of a neutral condition in which neither spur gear 4, 5 is engaged with the gear 10 and the latter, therefor, then functions merely as an idler gear.

This power take-off device provides, therefore, two separate shafts 4, 5 by which a driving connection can be made with two independent forms of equipment, such as a compressor and another piece of apparatus and either of which shafts can be coupled at will to the particular piece of apparatus to be driven therefrom.

To effect the desired driving condition shifter gear mechanism is provided consisting of a plate 12, conveniently of semi-circular shape, as shown, and centrally pivoted, as indicated generally at 13, upon the inside of the closed end wall 14 of the casing 1 and having oppositely directed diametrical ears 15 having circular extremities 16 and, on the inside face thereof, a series of circular pockets 17 disposed upon a common circle in circumferentially spaced relationship as shown particularly in Fig. III. These circular extremities 16 of the pivoted shifter plate 12 are engaged in forks 18 formed on the inside of a pair of boss members 19 slidably mounted in opposed relationship upon a pair of fixed or non-rotary spindles 20 secured in the opposite side walls of the casing upon opposite sides of the shifter plate and in overhead or spaced relationship to the gear and take-off shafts 4 and 5.

Each boss 19 is freely slidable in opposite directions along its respective spindle 20 under the control of the oscillatable shifter plate 12 and each boss is formed with a pair of spaced side plates 21 forming forks between them into which the gears 6 and 7 extend so that these gears are engaged on their opposite faces by these side plates 21 of their respective such forks.

As already indicated, the gears 6 and 7 are slidable upon their shafts 4 and 5 and the construction and arrangement is such that oscillation of the shifter plate 12 will produce a corresponding sliding adjustment of these gears in opposite directions along their respective shafts by the action of the fork arms 21 with the result that either gear can be brought, at will, into meshing and driving engagement with the intermediate and driving gear 10 or both gears 6 and 7 can be adjusted to a neutral position in which both gears are out of engagement with the gear 10 and the latter then functions as an idler gear.

The desired oscillatory motion of the shifter plate 12 can be arranged to be effected by the actuation of a lever 22 pivotally mounted, as indicated at 23 in Fig. II upon the outside of the closed end wall 14 of the casing 1. This lever can be operatively connected by a suitable flexible connection, after the manner of the well known Bowden wire connection, for the control of the shift lever and associated mechanism from a remote position, such as from the dash or instrument board of a vehicle to which the power take-off device is affixed. Such affixing is capable of being readily effected by fitting the flange 24 of the open end of the casing about an opening in the transmission housing (not shown) through which the gear 10 extends and securing the casing in position by suitable securing and studs inserted through the holes 25 in the said flange.

A ball 26 loaded by a spring 27 (Fig. II) and located for engagement with the pockets 17 in the shifter plate 12 serves to provide some degree of definition to indicate when a certain adjustment of the gearing has been effected, the engagement of the ball with the central pocket corresponding to "neutral" and the engagement of the ball with either of the outside pockets indicating that the "right" or "left" power take-off shaft is engaged for driving purposes.

Having thus described one practical embodiment of the invention, it being understood that other embodiments of modified detail are possible, what I claim is:

1. A power take-off transmission device comprising in combination, a hollow casing structure having opposed side walls, a first shaft terminating in said casing side walls, a driver gear wheel on said first shaft and within said casing, a pair of power take-off shafts terminating at one end in one said casing side wall and extending at their opposite ends beyond the outside of the opposite casing side wall, said power take-off shafts being parallel with each other and with said first shaft and the latter being centrally mounted with respect to said power take-off shafts in off-set relationship thereto, bearing means rotatably mounting said power take-off shafts upon the casing, a gear wheel on each said power take-off shaft in rotary engagement therewith and within said casing in position to have selective driver engagement with said driven gear wheel, means mounting each said take-off shaft gear wheel upon its shaft for axial adjustment therealong, and combined shifter and selector mechanism symmetrically mounted on said casing with respect to said shafts and upon the opposite side of said power take-off shafts to said driver shaft, said combined shifter and selector mechanism being operatively associated with said gear wheels on the power take-off shafts to shift said gear wheels simultaneously in opposite directions for their selective engaging and dis-engaging relationship with respect to said driver gear wheel.

2. A power take-off transmission device comprising in combination, a hollow casing structure having opposed side walls and a closed end and an opposite open end, a first shaft adjacent said open casing end and terminating in said casing side walls, a driver gear wheel on said first shaft and within said casing said driver gear being exposed through said open casing end, a pair of power take-off shafts terminating at one end in one said casing side wall and extending at their opposite ends beyond the outside of the opposite casing side wall, said power take-off shafts being parallel with each other and with said first shaft and the latter being centrally mounted with respect to said power take-off shafts in off-set relationship thereto, bearing means rotatably mounting said power take-off shafts upon the casing, a gear wheel on each said power take-off shaft and within said casing in position to have selective driven engagement with said driver gear wheel to drive their respective power take-off shafts, means mounting each said take-off shaft gear wheel upon its shaft for axial adjustment therealong, and combined shifter and selector mechanism symmetrically mounted on said casing with respect to said take-off shafts and upon said closed casing end and operatively associated with said power take-off gear wheels to shift the latter simultaneously in opposite directions for their selective engaging and dis-engaging relationship with respect to said driver gear.

3. A power take-off transmission device comprising in combination, a hollow casing structure having opposed side walls, a closed end wall and an open end wall, a first shaft terminating in said casing end walls adjacent said open end wall, a driver gear wheel on said first shaft and within said casing, said driver gear wheel being exposed to said open end wall, a pair of power take-off shafts terminating at one end in one said casing side wall and extending at their opposite ends beyond the outside of the opposite casing side wall, said power take-off shafts being parallel with each other and with said first shaft and the latter being centrally mounted with respect to said power take-off shafts in off-set relationship thereto, bearing means rotatably mounting said power take-off shafts upon the casing, a gear wheel on each said power take-off shaft and within said casing in position to have selective driven engagement with said driver gear wheel to drive their respective power take-off shafts, means mounting each said take-off shaft gear wheel upon its shaft for axial adjustment therealong, and combined shifter and selector mechanism mounted on said closed casing end wall and operatively associated with said power take-off gear wheels to shift the latter simultaneously in opposite directions for their selective engaging and dis-engaging relationship with respect to said driver gear, said mechanism comprising an angularly adjustable member symmetrically mounted on the inside of said casing end wall with respect to said take-off shafts, an outside actuator for said member, the latter having an operative axial sliding adjustment connection with both said gear wheels on the power take-off shafts, and automatically operable locator means tending to arrest movement of said angularly adjustable selector member at spaced intervals corresponding to gear engaged and neutral positions.

4. A power take-off transmission device comprising in combination, a hollow casing structure having opposed side walls, a closed end wall and an opposite open end wall, a first shaft terminating in said casing side walls adjacent said open end wall, a driver gear wheel on said first shaft and exposed through said open end wall, a pair of power take-off shafts terminating at one end in one said casing side wall and extending at their opposite ends beyond the outside of the opposite casing side wall, said take-off shafts being parallel with said first shaft in off-set relation thereto, said first shaft being centrally located with respect to said take-off shafts on the side of the latter adjacent said open end wall, bearing means rotatably mounting said power take-off shafts upon the casing, a gear wheel on each said power take-off shaft and within said casing in position to have selective engagement with said driver gear wheel, means mounting each said take-off shaft gear wheel upon its shaft for axial adjustment therealong but in rotatable engagement with its respective power take-off shaft and combined shifter and selector mechanism on said casing and operatively associated with both said gear wheels on the power take-off shafts to shift said gear wheels simultaneously in opposite directions for their selective engaging and disengaging relationship with respect to said driver gear, said mechanism comprising an angularly adjustable selector plate member pivotally mounted on the inside of said closed end casing wall in symmetrical relationship to said power take-off shafts, an actuator lever for said selector plate mounted upon the outside of the casing, a pair of lay shafts mounted in said casing side walls in parallel and off-set relationship to said take-off shafts, a rocker member on each said lay shaft and operatively connected one with each gear wheel on the power take-off shafts as well as with said selector plate, whereby adjustment of the latter is translated by said rocker members into an axial adjustment of said gear wheels, said selector plate having three defined positions corresponding to the engaged condition of each said gear wheel and neutral.

ROBERT W. WAGNER.

REFERENCES CITED

The following references are of record in the file of this patent:

UNITED STATES PATENTS

| Number | Name | Date |
|---|---|---|
| 1,230,661 | Brown | June 19, 1914 |
| 1,247,229 | Corwin | Nov. 20, 1917 |
| 1,321,293 | Drake | Nov. 11, 1919 |
| 2,231,144 | Wagner | Feb. 11, 1941 |
| 2,443,313 | Gerst | June 15, 1948 |

FOREIGN PATENTS

| Number | Country | Date |
|---|---|---|
| 462,164 | Great Britain | Mar. 3, 1937 |